July 26, 1960     B. BARÉNYI     2,946,623

AUTOMOBILE ROOF STRUCTURE

Filed Feb. 21, 1955

INVENTOR

Béla Barényi

BY *Dicke and Craig*

ATTORNEY

1

2,946,623

AUTOMOBILE ROOF STRUCTURE

Béla Barényi, Stuttgart-Hohenheim, Germany, assignor to Daimler-Benz Aktiengesellschaft, Stuttgart-Unterturkheim, Germany Filed Feb. 21, 1955, Ser. No. 489,678

Claims priority, application Germany Feb. 22, 1954

7 Claims. (Cl. 296—137)

The present invention relates to a roof structure for vehicles and especially automobiles.

It is the principal object of the present invention to provide a roof structure especially for cars which is manufactured more easily and at less expense than similar structures previously used.

Another object of the present invention is a roof structure which is especially adapted to be made of plastic materials.

A further object of the present invention is to provide a roof structure of the type described which enlarges and improves the range of visibility of such roof as compared with that of prior roof structures.

A principal feature of the new roof structure consists in its being composed of a central headpiece or top consisting of a front window, a central roof portion, and a rear window, which are separately manufactured and parts of which form generated surfaces of bodies which are symmetrical relative to a longitudinal axis, the axes of symmetry thereof lying within the central vertical plane extending in the longitudinal direction of the headpiece and therewith in the longitudinal direction of the vehicle.

More specifically, it is a feature of the invention that the headpiece entirely, or at least substantially, consists of several parts, each of which forms part of an elliptical cylinder or a cone which preferably has an oval base. All three parts of such headpiece or top may, according to the invention, be curved along elliptical cylindrical surfaces or cones, and at least the arched roof portion of such headpiece or top may have a curvature extending along the generated surfaces of a cone which has a circular or oval base. However, all three parts of the roof structure according to the invention, that is, the central roof portion together with the two windows, may also form parts of the generated surface of such a cone with a circular or oval base.

In a preferred embodiment of the invention, each of the points of intersection or joints between the individual parts of the roof structure lies within a respective transverse plane of the headpiece which, seen within the central vertical longitudinal plane of the headpiece or top, forms a smaller angle with the central roof portion than it does with the adjacent window.

Further objects, features, and advantages of the present invention will be apparent from the following detailed description and the accompanying drawings, in which—

Fig. 3 is a similar view of still another modification of the invention; while

Figure 1:
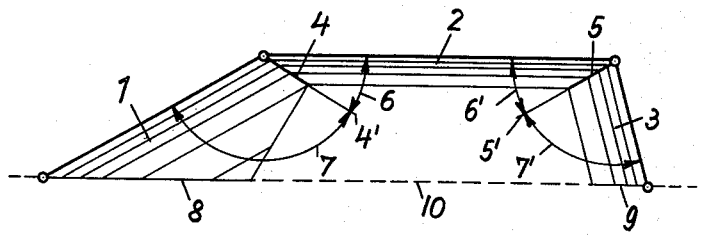
Fig. 1 shows a side view of a central headpiece or roof structure according to the present invention.

Referring to the drawings, and particularly to Fig. 1 thereof, the roof structure consists of three sections or parts, i.e. a front window 1, a central roof portion 2, and a rear window 3 which are manufactured separately. All three parts are curved along elliptical cylindrical surfaces and thus form parts of generated surfaces of an elliptical cylinder, the axes of symmetry of which lie within the central vertical plane extending in the longitudinal direction of the entire roof, which plane corresponds to the plane in which Fig. 1 is drawn.

The points of intersection or joints 4 and 5 between the mentioned parts 1, 2, and 3 lie within a single transverse plane 4' or 5', respectively, so that within the central vertical longitudinal plane of the entire roof each of these transverse planes 4' or 5' forms a smaller angle 6 or 6', respectively, with the central roof portion 2 than with the adjacent window 1 or 3, i.e. the angle 7 or 7', respectively.

As may further be seen in Fig. 1, both windows 1 and 3 are cut off horizontally at their bottom edge, and both lower edges 8 and 9 lie within the same plane 10.

Figure 2:
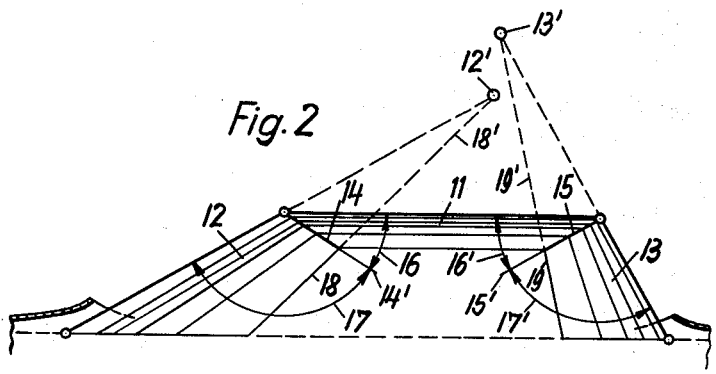
Fig. 2 is a similar view of a modification of the invention.

In the roof structure according to the modification of the invention as shown in Fig. 2, the central roof portion 11 has an arch of a curvature similar to that as shown in Fig. 1 and extending along the generated surface of an elliptical cylinder, the axis of symmetry lying within the central vertical longitudinal plane of the entire roof. However, as distinguished from Fig. 1, each of the two windows 12 and 13, is curved along the generated surface of a cone having an oval base, while the axes of symmetry lie within the central vertical longitudinal plane of the entire roof which corresponds to the plane shown by the drawing. The imaginary apices 12' and 13', respectively, of the two cones formed by the two windows do not, however, coincide with each other above the central roof portion 11.

As may further be seen in Fig. 2, when seen within the central vertical longitudinal plane of the roof similarly as in Fig. 1, the transverse planes 14' and 15' of the joints 14 and 15, respectively, each forms a smaller angle 16 or 16', respectively, with the central roof portion 11 than with the respective adjacent windows 12 or 13, as seen by the angles 17 and 17'. Fig. 2 further shows that the lateral edges 18 and 19 of the two windows extend along a generated surface 18' or 19', respectively, directed toward the respective apex 12' or 13' of each cone.

Figure 3:
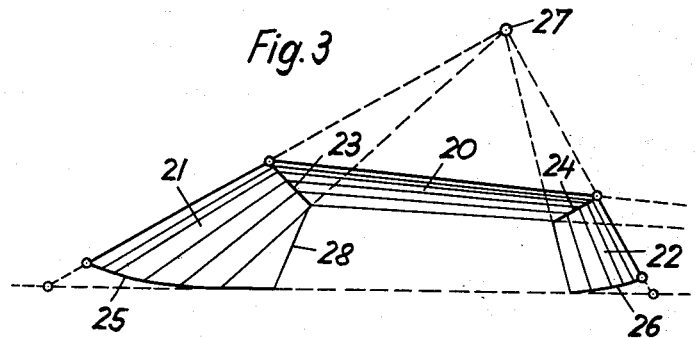

In the third embodiment of the present invention, as shown in Fig. 3, the imaginary apices of the two conical surfaces along which the two windows 21 and 22 are curved coincide at a point 27. However, the lateral edges 28 of the front window 21 extend downwardly at a steep angle and thus do not form any generated surfaces which are directed toward the apex 27.

Figure 4:
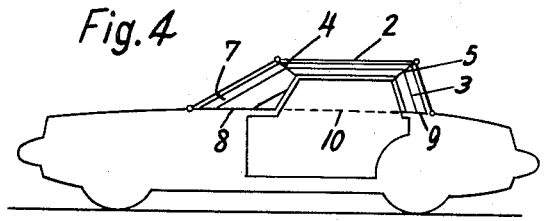
Fig. 4 is a smaller scale side view showing the roof structure of Fig. 1 installed on an automobile body.

The roofs of Figs. 2 and 3 may be disposed on a car body in a manner generally similar to the showing of Fig. 4.

While I have described my invention with reference to three preferred embodiments thereof, I wish to have it understood that the invention is in no way limited to the details of such embodiments, but is capable of numerous modifications within the scope of the appended claims. Thus, for example, the three parts of the roof structure may also be curved individually or combined along circular cylindrical surfaces or along the generated surfaces of cones having a circular base, and both the lower edges as well as the lateral edges of the windows may be cut off along any other planes than those described and shown in the drawings.

Having thus described my invention, what I claim as new is:

1. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of cones each having an axis of symmetry, the axes of symmetry of said cones lying within the central vertical plane extending in the longitudinal direction of said top, said central roof portion and said front window being connected along first lines of juncture, said central roof portion and said rear window being connected along second lines of juncture, all of said lines of juncture being curved, said first lines of juncture lying in a first single, flat plane, said second lines of juncture lying in a second, single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles.

2. A top as defined in claim 1, wherein the lateral edges of at least one window extend along one of said generated surfaces of one of said cones in the direction of its imaginary apex.

3. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of bodies each having an axis of symmetry, the axes of symmetry of said bodies lying within the central vertical plane extending in the longitudinal direction of said top, said central roof portion and said front window being connected along first lines of juncture, said central roof portion and said rear window being connected along second lines of juncture, all of said lines of juncture being curved, said first lines of juncture lying in a first single, flat plane, said second lines of juncture lying in a second, single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles, said generated surfaces formed by said windows being those of cones whose imaginary apices coincide at one point.

4. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of bodies each having an axis of symmetry, said bodies being those of an elliptical cylinder and a cone, the axes of symmetry of said bodies lying within the central vertical plane extending in the longitudinal direction of said top, said central roof portion and said front window being connected along first lines of juncture, said central roof portion and said rear window being connected along second lines of juncture, all of said lines of juncture being curved, said first lines of juncture lying in a first single, flat plane, said second lines of juncture lying in a second, single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles.

5. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of elliptical cylinders each having an axis of symmetry, the axes of symmetry of said elliptical cylinders lying within the central vertical plane extending in the longitudinal direction of said top, said central roof portion and said front window being connected along first lines of juncture, said central roof portion and said rear window being connected along second lines of juncture; all of said lines of juncture being curved, said first lines of juncture lying in a first single, flat plane, said second lines of juncture lying in a second single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles.

6. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of bodies each having an axis of symmetry, each of said bodies being that of a cone having an oval base, the axes of symmetry of said bodies lying within the central vertical plane extending in the longitudinal direction of said top, said central roof portion and said front window being connected along first lines of juncture, said central roof portion and said rear window being connected along second lines of juncture, all of said lines of juncture being curved, said first line of juncture lying in a first single, flat plane, said second lines of juncture lying in a second, single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles.

7. In an automobile of the sedan type having a passenger space, a top which is adapted to be readily manufactured by simple means and which is adapted to enclose the upper part of said passenger space, said top being formed of three separately made parts, said parts including a front window, a central roof portion, and a rear window, said front window, said central roof portion and said rear window respectively forming portions of generated surfaces of bodies each having an axis of symmetry, each of said bodies being that of a cone having a circular base, the axes of symmetry of said bodies lying within the central vertical plane extending in the longitudinal direction of said top, said central roof portion and said front window being connected along first lines of juncture, said central roof portion and said rear window being connected along second lines of juncture, all of said lines of juncture being curved, said first lines of juncture lying in a first single, flat plane, said second lines of juncture lying in a second, single, flat plane, said planes intersecting said central vertical plane at right angles thereto, the intersections of said single, flat planes with said central vertical plane forming unequal angles with the lines respectively constituting the intersections of said central vertical plane with said windows and with said central roof portion, the angles formed by said intersections of said single flat planes with said central vertical plane and by the said intersections of said central vertical plane with said central roof portion being the smaller of said unequal angles.

References Cited in the file of this patent

UNITED STATES PATENTS

| | | |
|---|---|---|
| D. 97,697 | Buehrig | Dec. 3, 1935 |
| 1,147,607 | Chisko | July 20, 1915 |
| 1,264,804 | Jacobs | Apr. 30, 1918 |
| 2,373,214 | Wolkenhauer | Apr. 10, 1945 |
| 2,747,923 | McLean | May 29, 1956 |

FOREIGN PATENTS

| | | |
|---|---|---|
| 963,078 | France | June 28, 1950 |
| 680,393 | Great Britain | Oct. 1, 1952 |